United States Patent Office 3,635,917
Patented Jan. 18, 1972

3,635,917
METHOD OF PRODUCING HIGHLY CONCENTRATED ACRYLONITRILE POLYMER AND COPOLYMER SOLUTIONS
Eberhard W. Roth, Hans-Joachim H. G. Kröning, and Eberhard P. H. Peter, Premnitz, Germany, assignor to Veb Chemiefaserwerk Friedrich Engels, Premnitz, Germany
No Drawing. Filed Dec. 19, 1969, Ser. No. 886,733
Int. Cl. C08f 3/76, 15/38
U.S. Cl. 260—79.3 M
3 Claims

ABSTRACT OF THE DISCLOSURE

A solution prepared by polymerizing acrylonitrile alone or with at least one comonomer in a solvent is concentrated and demonomerized by evaporation in two stages,, the first stage being at a pressure of at least 50 torr and the second stage being at a pressure of no greater than 40 torr.

---

This invention relates to a method of producing highly concentrated solutions of acrylonitrile polymers and copolymers constituted of at least 50% acrylonitrile in dimethyl formamide or dimethylacetamide, which solutions are suitable for the production of fibers and filaments, hereinafter generically referred to as "filaments."

Solutions of acrylonitrile polymers or copolymers with at least one comonomer suitable for the production of filaments, especially by spinning, which solutions contain, other than solvent, predominantly the acrylonitrile polymer or copolymer, have been prepared either by dissolving the polymer or copolymer in a solvent or by direct polymerization of acrylonitrile alone or with at least one comonomer in an organic solvent for the monomers as well as the resultant polymer or copolymer. The latter type of method has a number of advantages since there is eliminated intermediate isolation of the polymeric product and, correspondingly, a number of operations and the process can be carried out essentially continuously. In order to remove the unpolymerized monomer from the polymerization solution, the polymerization solution usually is subjected to a vacuum distillation. For this purpose, often apparatus is used in which the solution is evaporated in the form of a thin film or layer. It is known, for example, to spin according to known methods solutions of acrylonitrile polymers or copolymers which are prduced by the direct polymerization of the monomers in dimethyl formamide and from which subsequently, for example, in a thin film evaporator, unpolymerized monomers are removed.

The prior art methods are mostly wet spinning methods; however, such solutions have been used for dry spinning, too.

Dry spinning technology requires, as compared with the wet spinning methods, a higher polymer concentration and, concurrently, a higher spinning solution viscosity, in order to make possible the forming of useful filaments.

While the preparation of solutions for wet spinning methods is relatively simple on account of a high polymer concentration not being necessary, the preparation of higher concentration solutions for dry spinning is more difficult with respect to the removal of unpolymerized monomer. There are other disadvantages, too. The solution resulting from the polymerization has a relatively low polymer concentration and a large proportion of unconverted monomer. Accordingly, in order to increase the concentration of the solution to the necessary high level and remove the unconverted monomer, solvent as well as monomer are evaporated from the solution. There is the risk that in consequence of the relatively great decrease in the volume of the solution there may form locally in the thin film evaporator incrustations due to over-concentration of the solution. There is also the risk that in sections of the apparatus in which the solution is boiling at a relatively high temperature due to much of the monomer having already been evaporated and the solvent having a higher boiling point than the monomer, the solution may be heated to too high a temperature and thereby be damaged. Also, it is not fully assured that the monomer will be completely removed because the high viscosity of the solution occurring near the end of the process impedes the evaporation of the small proportion of low boiling compnent, i.e., monomer, remaining. The presence of residual monomer in the spinning solution can cause undesired gas or vapor bubble formation during dry spinning, thereby leading to filament breakage and which moreover impairs the commercial acceptability of the process. Problems also occur in the condensation of the vaporized monomer. On the one hand, the distillation process is carried out at the lowest possible pressure in order to accelerate the evaporation of the solvent, which boils at higher temperature than the monomer, and make possible the use of conveniently low temperatures. On the other hand, since the condensation temperature of the vaporized monomer is exceptionally low at such low pressures, high expenditure of cooling energy and large condensation surfaces are necessary to assure complete condensation of the monomer and maintenance of the vacuum.

It is an object of the invention to provide a method for the demonomerization and simultaneous concentration of solutions of acrylonitrile polymer or copolymers obtained by solution polymerization, with the elimination of the aforementioned difficulties, to obtain highly concentrated solutions of good quality which are suitable for spinning by the dry spinning method.

According to the invention, the polymer or copolymer solution obtained by conventional solution polymerization in dimethyl formamide or dimethyl acetamide is processed in conventional thin film evaporating apparatus in two stages. In the second stage the distillation pressure is lower than in the first stage. In the first stage there occurs the removal of the unpolymerized monomer along with a relatively small proportion of the solvent, and in the second stage there occurs further evaporation of the solvent until the desired high polymer concentration of the solution is attained.

The polymerization solution is first passed through a thin film evaporating apparatus, for example, a thin film evaporator of vertical construction provided with a rapidly rotated rotor, in which the pressure is at least 50 torr, preferably 50 to 100 torr, and which is heated with, for example, steam at a temperature of at least 120° C. During the downward passage of the solution through the evaporator, the unpolymerized monomer in the mixture of monomer and solvent evaporates and the temperature of the film increases, corresponding to the increasing boiling point of the evaporating mixture, the low boiling monomer preferably 50 to 100 torr, and which is heated with, for content of which is continuously being depleted.

The proportion of monomer, which boils at lower temperature than the solvent, in the evaporating liquid decreases during the downward flow of the film of solution until a point in time is attained at which practically only the solvent is evaporating. At this point, the first stage is completed and the solution is passed out of the evaporator.

The vapor leaving the evaporator during the first stage in the case in which the pressure is 50 to 100 torr, dimethyl formamide is the solvent and acrylonitrile is the sole monomer, is at a temperature of 55 to 75° C. Since the boiling point of pure acrylonitrile under these conditions is at least about 10° C. and generally about 10 to 25° C. higher, the condensation of the vapor can be carried out without the use of special cooling means.

The demonomerized polymer solution is then passed through a second evaporator in which the solvent is evaporated off at a pressure of no greater than 40 torr until desired polymer concentration is attained. In the case of dimethyl formamide as the solvent, the distillation temperature at these low pressures is no greater than 65° C., a temperature at which thermal damage of the polymer solution is not possible.

Since the distillation pressure in the second stage is lower than in the first, the distillation in both stages can be carried out at about the same temperature.

Conveniently, the two vaporization stages can be carried out in a continuous procedure in which the demonomerized solution from the first evaporator directly and continuously, for example by means of a pump, is fed into the second evaporator.

Advantages of the method of the invention are that highly concentrated spinning solutions are produced under such conditions that unimpaired quality of the solution is assured and damage due to excessive heat or uncontrollable evaporating conditions is avoided. Furthermore, removal and recovery of unpolymerized monomer with little expenditure of cooling energy and essentially no loss of monomer is made possible.

Examples of monomers copolymerizable with acrylonitrile which are, in general, ethylenically unsaturated organic compounds, are styrene and its derivatives, acrylic and methacrylic acid esters such as methyl acrylate, ethyl acrylate and methyl methacrylate, acrylamide, methacrylamide, fumaric and maleic acids and their derivatives, vinyl acetate, vinyl pyridene, vinylidene chloride and ethylenically unsaturated sulfonic acid compounds and their salts such as sodium allyl sulfonate.

The polymer solution obtained by the solution polymerization generally is of a polymer concentration of 14 to 20% by weight. The concentration of the polymer solution for dry spinning must be at least 25% by weight and preferably is 25 to 35% by weight.

The invention will further be understood by reference to the following specific operating examples:

EXAMPLE 1

A polymerization solution constituted of 16% by weight of an acrylonitrile polymer constituted, by weight, of 93% acrylonitrile units and 7% methyl acrylate units, 11.16% by weight of unconverted acrylonitrile, 0.84% by weight of unconverted methyl acrylate and 72% by weight of dimethyl formamide is continuously fed into a thin film evaporator of vertical construction which is provided with a rapidly rotating rotor and which is heated with steam at three atmospheres absolute pressure. The evaporator is maintained at a pressure of 60 torr. The vapor leaving the top of the evaporator is at a temperature of 65° C. The solution leaving the bottom of the evaporator has a polymer content of 22.5% by weight and a residual monomer content of less than 0.2% by weight. This solution is fed into a second evaporator also heated with steam at three atmospheres absolute pressure in which a pressure of 35 torr is maintained. The solution leaving the bottom of this evaporator has a temperature of 65° C. and a polymer content of 29% by weight. It is free of gas-forming inclusions and can immediately be fed to a dry spinning machine.

EXAMPLE 2

A polymerization solution constituted of 17.2% by weight of a polymer constituted, by weight, of 88 acrylonitrile units, 11% vinyl acetate units and 1% sodium allylsulfonate units, 9.5% by weight of unconverted acrylonitrile, 1.2% by weight of unconverted vinyl acetate, 0.1% by weight of unconverted sodium allylsulfonate and 72% by weight of dimethyl acetamide is continuously fed into a thin film evaporator constructed and heated as in Example 1 and the pressure in which is maintained at 85 torr. The vapor leaving the top of the evaporator is at a temperature of 72° C. The solution leaving the bottom of the evaporator has a polymer content of 24% by weight and a residual monomer content of 0.12% by weight. This solution is fed into a second evaporator also heated with steam at three atmospheres absolute pressure and the pressure in which is maintained at 30 torr. The solution leaving the bottom of this evaporator has a temperature of 68° C. and a polymer content of 30.5% by weight. It is free of gas-forming inclusions and can immediately be fed to a dry spinning machine.

What is claimed is:

1. In the method of producing highly concentrated solutions of acrylonitrile polymers and copolymers which solutions are suitable for dry spinning into filaments, comprising polymerizing acrylonitrile or acrylonitrile with at least one comonomer in an organic solvent selected from the group consisting of dimethyl formamide and dimethyl acetamide to produce a polymer solution having a concentration of polymer of 14 to 20% by weight and subjecting the resulting polymer solution to evaporation to remove therefrom unconverted monomer and a portion of the solvent, the improvement comprising evaporating the polymer solution in two stages, the first stage being at a pressure of at least 50 torr and the second stage being at a pressure no greater than 40 torr, the first stage being terminated as soon as essentially all of the unconverted monomer has been evaporated off and the second stage being terminated when a quantity of solvent has been evaporated off such that the polymer concentration of the solution is at least 25% by weight.

2. Method according to claim 1, in which the polymer solution remaining after the first stage of the evaporation is continuously fed to the second stage.

3. Method according to claim 1, in which the second stage is terminated when the polymer concentration is 25 to 35% by weight.

References Cited

UNITED STATES PATENTS 3,379,670   4/1968   Corradi _____ 260—32.6
3,395,133   7/1968   D'Alelio _____ 260—88.7

JOSEPH L. SCHOFER, Primary Examiner

C. A. HENDERSON, Jr., Assistant Examiner

U.S. Cl. X.R.

159—6 W, 49; 260—32.6 N, 78.4 R, 80.81, 85.5 R, 85.5 P, 88.7 R, 88.7 G